Patented Dec. 1, 1936

2,062,463

UNITED STATES PATENT OFFICE 2,062,463

FUELS

Louis E. Levi, Milwaukee, Wis.

No Drawing. Application January 22, 1934,
Serial No. 707,729

2 Claims. (Cl. 44—9)

The invention relates to liquid fuels for internal combustion engines and heating devices, and has for an object to provide a fuel having incorporated therein an addition substance to effect more complete combustion, minimize carbon deposits, reduce the amount of carbon monoxide in the exhaust gases, and permit easier ignition, and which fuel, in the case of vehicle engines, will reduce the tendency to detonate, improve acceleration, power and fuel efficiency, be harmless to metal surfaces and spark plugs, and be non-poisonous to handle.

The invention further consists in the several features hereinafter described and claimed.

Many liquid fuels for heating devices and internal combustion engines are found to burn incompletely, causing the formation of carbon deposits, producing carbon monoxide in the gases of combustion, and resulting in a loss of heating value and power.

I have found that when small quantities of certain non-metallic organic substances are incorporated in liquid fuels, the undesirable effects above noted are largely overcome. In particular, esters of organic acids, and especially those esters, such as formates and oxalates, having a high percentage of oxygen are found to be desirable. Methyl formate has desirable effects when dissolved in gasoline in the proportion of about one ounce by weight of the former to one gallon of the latter. Preferably, there is also dissolved in the methyl formate a small quantity of a nitro compound, such as dinitro-benzene or dinitrophenol, in the proportion of about seven ounces by weight of the former to about one ounce of the latter. Ethyl and other alkyl formates may also be used in place of all or part of the methyl formate. The dinitrobenzene, although not soluble in gasoline, is readily soluble in methyl formate, and the solution is soluble in gasoline. Five ounces of this solution added to six gallons of gasoline are found to be sufficient to produce the effects desired.

Another suitable gasoline-treating solution consists of methyl acetate, 8 parts; methyl acetone, 7 parts; and dinitrobenzene, 1 part. About one ounce of the solution is sufficient to treat one gallon of gasoline.

Aldehydes, such as acetaldehyde, furfuraldehyde, and benzaldehyde, can be used in place of, or in addition to, methyl formate. A suitable solution consists of methyl formate, 12 parts; furfuraldehyde, 2 parts; and dinitrobenzene, 2 parts. About one ounce of the solution is sufficient for one gallon of gasoline.

The gasoline-treating solution may also contain carboxylic acids, such as succinic and benzoic acids, which are first dissolved in an ester and the solution then dissolved in the gasoline. A suitable solution consists of methyl formate, 12 parts; succinic acid, 2 parts; dinitrobenzene, 2 parts; all by weight. About one ounce of the solution is sufficient to treat one gallon of gasoline.

Other nitration compounds may be used such as nitrosophenol, and esters of nitric and nitrous acids, such as methyl nitrate, nitromethane, and propyl nitrite.

What I claim as new and desire to secure by Letters Patent is:

1. A composition of matter for solution in liquid hydrocarbon fuels, comprising dinitrobenzene dissolved in methyl formate.

2. A composition of matter for solution in liquid hydrocarbon fuels, comprising about seven parts by weight of methyl formate having dissolved therein about one part of dinitrobenzene.

LOUIS E. LEVI.